June 1, 1954  G. B. HILL  2,679,719
DIVIDER FOR HARVESTER PICKUPS
Filed Feb. 1, 1951
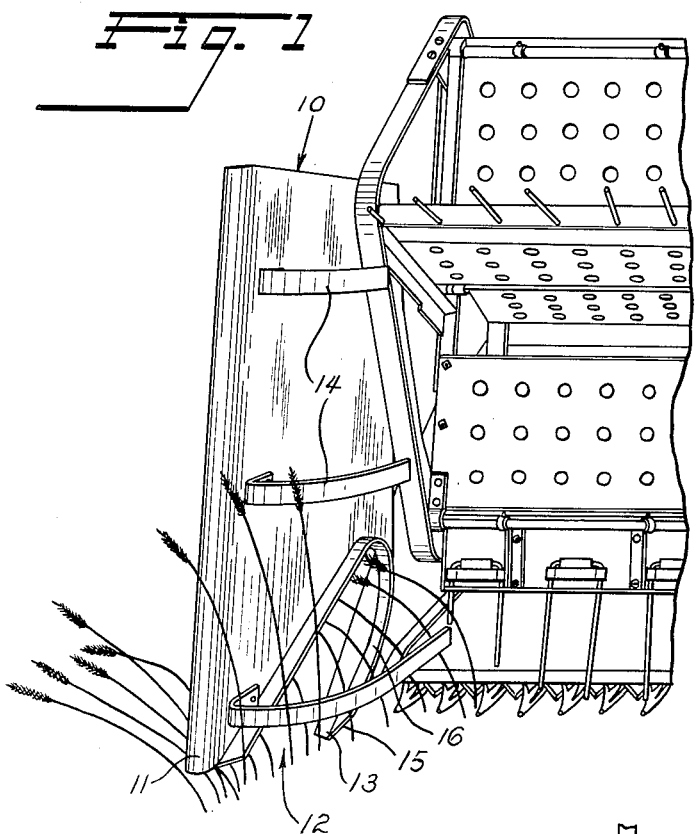
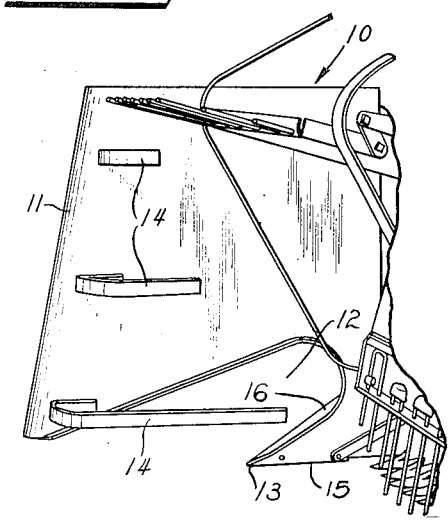
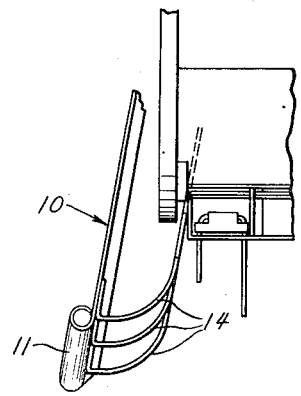
INVENTOR
GEORGE B. HILL
BY Allan R. Redrow
ATTORNEY Patented June 1, 1954

2,679,719

UNITED STATES PATENT OFFICE 2,679,719

DIVIDER FOR HARVESTER PICKUPS

George B. Hill, New Holland, Pa., assignor to The New Holland Machine Division of the Sperry Corporation, New Holland, Pa., a corporation of Delaware Application February 1, 1951, Serial No. 208,941

3 Claims. (Cl. 56—314)

This invention relates to forage and grain harvesting machinery and more particularly to a divider for use in association with the pick-up of the harvester, the divider being adapted to separate the stalks of a grain, hay, maize, sorgo or similar crop so that a swath can be cut cleanly and delivered into the pick-up.

This invention in general is an improvement on known dividers for separating a swath of a crop which is being harvested and provides a new construction for use with a reel type pick-up wherein the crop is first separated with the divider and then the reel is operative to push the crop through a mower and up onto the elevator conveyor. The divider of this invention has incorporated therewith a means for lifting up any down crop so that all of the crop is raised up at the edge of the swath and delivered into reel and mower so that a clean edge is trimmed along each swath and none of the crop is lost because of being beat down by the weather and falling under the edge of the divider as has frequently happened in the past. The divider here shown also cooperates with the reel to accomplish a proper feeding of the crop over the mower and into the pick-up and this feeding is accomplished in a mower to preclude any wrapping or entanglement of the crop in the reel as has sometimes happened in the past with this type of pick-up.

The invention is shown in the drawings wherein:

Figure 1 is a perspective view of the divider looking at the front of a portion of the reel carried on the harvester pick-up;

Figure 2 is a side elevation on a reduced scale relative to Figure 1 of the pick-up looking across the face of the pick-up; and Figure 3 is a top plan view on a similarly reduced scale, showing the general relationship of the divider with respect to the side of the crop pick-up and reel.

Harvesting machines with mowing attachments integral therewith are well known and these machines are adapted to be moved through a field having a standing crop to sever the crop and deliver the cut material on to a pick-up conveyor that feeds the grain or forage into the harvesting machine. As the machine is moved through a field it cuts a swath through the crop and of course the machine must make several passes through the field to cut all of the standing grain or the like.

In some cases where the weather has beaten down the crop and again, in the growth of certain kinds of hay crops and other forage crops, the stems and branches of the plant become intertwined such that a clean separation cannot be accomplished along the edge of the swath being cut by the mower. It has been proposed that dividers be driven down through the crop ahead of the mower to provide a line of separation to assist the mower in cutting a clean swath. However, when a divider is run through crops such as suggested above, some of which may be beaten down by the wind and rain or in said certain hay crops the branches of which are intertwined, a clean line of separation cannot be made.

With these down or lodged crops and other hay crops, the lower edge of the divider sometimes rides over the material that is down or close to the ground and thus the crop is not delivered into the mower to provide a clean cut along the edge of the swath. The improvement of this invention is concerned with the construction of the lower edge of the divider to accomplish a raising of the down crop or lifting of hay crop or the like so that the material that would otherwise ride under the divider, is raised and delivered into the mower and a clean separation of the edge of the swath can be made.

Referring to Figure 1, the divider is shown mounted on the right hand side of a harvester pick-up with respect to its forward motion through the field. This divider is adapted for use with any type of pick-up having a mower but preferably as here shown. In this form of pick-up, a rotating reel is provided to gather in the crop and push it positively against the mower which is disposed at the lower end of the harvester pick-up.

The divider 10 is mounted to extend forwardly from the pick-up and in front of the mower and is provided with a rolled front edge 11 which drives into the crop to perform the initial separation. The front edge 11 will separate the standing grain easily and other crops that grow relatively straight upwardly, however, in the case of grain and with some of the hay crops, the stalks of the plants may be beat down by the weather or otherwise entangled so that the front edge 11 can not perform a proper separation alone. This down or lodged crop will normally tend to flow under the lower edge of the divider and would not be passed to the mower although the roots and stalks of the plants may extend well over into the swath that is being mowed.

In order to overcome this failure of known dividers to handle a grain or hay crop of this type, the lower edge of the divider here shown is provided with an upwardly and rearwardly directed notch 12. The rear edge of the notch forms a point 13 that serves a purpose which will appear more fully below and suitable free ended guide arms 14 may be mounted on the divider to direct the separated swath of the crop backwardly along the inside wall of the divider and into the mower and pick-up reel.

As the divider moves forwardly and rides over any down or lodged crop, the nose or point 13, which is mounted to follow closely the contour of the ground, passes under the stalks of the down crop and as the divider continues to move forwardly, the stalks of the down material ride up on the rear edge of the notch. This rear edge 16 of the slot is inclined rearwardly and upwardly from its intersection at the point 13 with the horizontal bottom edge 15 of the divider, so that the inclined edge 16 can ride under and lift crops which may have been knocked down either by the divider or by the weather. The bulk of this down or lodged crop material is, in this manner, raised through the notch 12 without any substantial damage to the leafy structure thereof and the crop is raised so that it can be presented to the reel and mower which are disposed at the end of the pick-up. The point 13 thus acts somewhat like the tooth of a comb to raise up the down material so that its stalks are lifted about perpendicular to the soil whereby to pass the crop to the reel and lift the stalks so that they can be cut by the mower.

The operation of the structure is quite apparent from the description given above and as the machine moves through the field, the main wall portion of the divider 10 initially serves to separate all of the straight crop. However, any of the crop material that has been beat down, passes under the lower edge of the divider until it is engaged upon the inclined rear slot edge 16 and is raised as the point 13 passes under the stalks of this portion of the crop. As the stalks are raised the body of this crop is pulled through the notch 12 to be cleanly severed and delivered by the reel to the elevator conveyor, so that a swath is produced having no uncut material and in which all of the down material may be easily and properly harvested.

It is apparent that this structure provides a means having all of the advantages of a conventional divider and includes also crop raising means to ensure the cutting of a full swath. The placement of the raising point at the end of the notch in the lower edge of the divider produces this desired result and yet avoids the wide sweeping effect that would knock down a considerable quantity of the crop at the places where the harvester equipment is turned, which sweeping action would be encountered if a floating point were mounted on the front end of the divider to accomplish the same purpose. Another advantage inherent in the present structure resides in the fact that the point 13 is fixed adjacent the mower and need not be mounted in the manner of a floating point, thus the divider and point easily pass over obstructions with the mower which follows the contour of the ground. Thus the simple structure here shown provides a relatively short sturdy divider having the advantage of a high nose for separating standing crops and yet having a fixed point that may be mounted integral with the mower or pick-up.

The above description relates to the preferred form of this invention. It is obvious that many modifications thereof may occur to those skilled in the art which may come within the scope of the following claims.

I claim:

1. A divider for use with a reel type mower and harvester pick-up, comprising a substantially vertical wall fixed relative to the pick-up and in front of the mower, said wall being positioned at one end of the mower and generally perpendicular thereto to slice through the crop to separate a swath from the remainder of the crop as the mower moves forwardly, the front edge of said wall being substantially vertical and operative to part the standing crop and the lower edge of said wall extending horizontally, said wall being formed with a slot opening downwardly through its lower edge, that portion of the wall defining the rear edge of said slot being inclined rearwardly and upwardly from its intersection with the lower edge of the divider and thus providing means for riding under and lifting crops which may have been knocked down either by the divider or by the weather.

2. A divider for use with a reel type mower and harvester pick-up, comprising a substantially vertical wall fixed relative to the pick-up and in front of the mower, said wall being positioned at one end of the mower and generally perpendicularly thereto to slice through the crop to separate a swath from the remainder of the crop as the mower moves forwardly, the front edge of said wall being substantially vertical and operative to part the standing crop, and the lower edge of said wall extending horizontally, said wall being formed with a slot opening downwardly through its horizontal lower edge, said slot being inclined upwardly and rearwardly with regard to the movement of the wall, whereby portions of the crop falling beneath the lower edge of the divider will be received and raised in said inclined slot as the divider moves over the ground.

3. A divider for use with a reel type mower and harvester pick-up, comprising a substantially vertical wall, the front edge of said wall being substantially vertical and operative to part the standing crop, and the lower edge of said wall extending horizontally, said wall being formed with a slot opening downwardly through its lower edge, that portion of the wall defining the rear edge of said slot being inclined rearwardly and upwardly from its intersection with the lower edge of the wall, and thus providing means for riding under and lifting crops which may have been knocked down by the divider or the weather.

References Cited in the file of this patent

UNITED STATES PATENTS

| Number | Name | Date |
| --- | --- | --- |
| 235,903 | Scarr | Dec. 28, 1880 |
| 819,797 | Rand | May 8, 1906 |
| 1,172,033 | Mueller | Feb. 15, 1916 |
| 1,616,430 | Methner | Feb. 1, 1927 |
| 1,690,966 | Chaney | Nov. 6, 1928 |